(12) United States Patent
Takahashi et al.

(10) Patent No.: US 7,518,858 B2
(45) Date of Patent: Apr. 14, 2009

(54) MOUNTING STRUCTURE AND MOUNTING METHOD FOR ROTATING DISK STORAGE DEVICE

(75) Inventors: Satoshi Takahashi, Kanagawa (JP); Masashi Tsuyama, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 458 days.

(21) Appl. No.: 11/314,321

(22) Filed: Dec. 20, 2005

(65) Prior Publication Data

US 2006/0133030 A1 Jun. 22, 2006

(30) Foreign Application Priority Data

Dec. 20, 2004 (JP) ............................. 2004-367638

(51) Int. Cl.
*H05K 1/16* (2006.01)
(52) U.S. Cl. ..................................................... 361/685
(58) Field of Classification Search ................. 361/685
See application file for complete search history.

(56) References Cited

U.S. PATENT DOCUMENTS

| | | | | |
|---|---|---|---|---|
| 4,683,520 A | * | 7/1987 | Grassens et al. | 361/685 |
| 4,896,777 A | * | 1/1990 | Lewis | 361/685 |
| 5,325,263 A | * | 6/1994 | Singer et al. | 361/685 |
| 5,518,412 A | * | 5/1996 | Larabell | 439/157 |
| 6,008,984 A | * | 12/1999 | Cunningham et al. | 361/685 |
| 6,186,804 B1 | * | 2/2001 | Smith et al. | 439/157 |
| 7,108,524 B2 | * | 9/2006 | Wahler | 439/159 |
| 7,280,352 B2 | * | 10/2007 | Wilson et al. | 361/685 |

FOREIGN PATENT DOCUMENTS

| | | |
|---|---|---|
| JP | 2003-198153 | 7/2003 |
| JP | 2003-216277 | 7/2003 |
| JP | 2004-213817 | 7/2004 |

* cited by examiner

*Primary Examiner*—Anatoly Vortman
*Assistant Examiner*—Adrian S Wilson
(74) *Attorney, Agent, or Firm*—Townsend and Townsend and Crew LLP; John Henkhaus (57) ABSTRACT

Embodiments of the invention provide a mounting structure adapted to easily attach and remove a magnetic disk drive thereto and therefrom. In one embodiment, the mounting structure includes a device connector connectable to an interface connector. A clamper moves between a fixing position and a releasing position to secure or release an end portion of a housing. A lever keeps the clamper at the releasing position until the interface connector is connected to the device connector when a magnetic disk drive is pushed into a mounting structure. The clamper positions the clamper at the fixing position after the interface connector has been connected to the device connector.

18 Claims, 7 Drawing Sheets

MOUNTING STRUCTURE AND MOUNTING METHOD FOR ROTATING DISK STORAGE DEVICE

CROSS-REFERENCES TO RELATED APPLICATIONS

This application claims priority from Japanese Patent Application No. JP2004-367638, filed Dec. 20, 2004, the entire disclosure of which is incorporated herein by reference.

BACKGROUND OF THE INVENTION

The present invention relates to a mounting structure used for connecting a rotating disk storage device, such as a magnetic disk drive or an optical magnetic disk drive, to an external connector.

A magnetic disk drive as an example of a rotating disk storage device is subjected to operating tests, parameter setting, and adjustments by being connected to an external test machine after assembly of parts. If subjected to mass production, a large number of magnetic disk drives are mounted in a test chamber all at once. An interface connector is then connected to a device connector of the chamber and the test is carried out by connecting the device connector to a test computer. The test chamber includes a mounting structure for securing each of the magnetic disk drives and connecting a test connector of the test chamber connected to a test machine to the interface connector of the magnetic disk drive.

A magnetic disk spins at high speed and a carriage assembly repeatedly rotates inside the operating magnetic disk drive. As a result, vibrations occur in a housing forming an outside of the magnetic disk drive. If the housing of the magnetic disk drive vibrates, the drive's performance of positioning a head to a required track during testing is degraded. An unnecessary error then occurs, thus impeding proper testing. Further, since a large number of magnetic disk drives are accommodated in the chamber, it becomes necessary to prevent combined vibrations of other test machines from affecting each of the magnetic disk drives.

A base cover of the magnetic disk drive is generally formed of a thin steel sheet. On receiving an external force applied thereto, the base cover flexes inwardly and can touch the magnetic disk or other parts. As a method for securing the magnetic disk drive in the test chamber, it is possible to use screws that are used for actually securing the magnetic disk drive. Using screws for securing the drive takes a certain amount of time for attachment and removal, resulting in reduced productivity. In addition, it is necessary to positively connect the interface connector of the magnetic disk drive to the chamber's drive connector in the test chamber.

Patent Document 1 (Japanese Patent Laid-open No. 2002-8358) discloses a magnetic disk drive mounting structure. The mounting structure is applied to an electronic device in which an HDD as an information storage device is removably incorporated. The mounting structure is intended for improving positioning performance and cooling performance involved with vibrations occurring during positioning of the head of the HDD. Patent Document 2 (Japanese Patent Laid-open No. 2004-213817) discloses a cabinet system. The cabinet system allows a shielded electronic device secured to offer sufficient vibration and impact resistance performance and to be easily removed and offers good working efficiency during service jobs. Patent Document 3 (Japanese Patent Laid-open No. 2003-198153) discloses an electronic device unit mounting structure achieving a reduced number of man-hours by allowing the unit to be removed from, and reinstalled in, the device extremely easily and without requiring any tools.

BRIEF SUMMARY OF THE INVENTION

It is therefore a feature of the present invention to provide a mounting structure allowing a rotary disk storage device to be removed or reinstalled within a short time. It is another feature of the present invention to provide a mounting structure adapted to secure positively a magnetic disk drive thereto. It is still another feature of the present invention to provide a mounting structure adapted to positively connect an interface connector thereto. It is a further feature of the present invention to provide a test chamber for a rotary disk storage device, to which such a mounting structure is applied, and a removal and reinstallation method therefor.

According to a first aspect of the present invention, there is provided a mounting structure adaptable to attach and remove a rotary disk storage device including a recording medium, an interface connector, and a housing thereto and therefrom, and to plug and unplug the interface connector thereto and therefrom, the mounting structure comprising: a device connector connectable to the interface connector; a guide which positions the rotary disk storage device within the mounting structure; a clamper movable in a vertical direction of the recording medium between a fixing position and a releasing position to fix or release an end portion of the housing; and a lever capable of positioning the clamper at the releasing position until the interface connector is connected to the device connector as the rotary disk storage device is pushed into the mounting structure, and positioning the clamper at the fixing position after the interface connector has been connected to the device connector.

The lever keeps the clamper at the releasing position until the interface connector and the device connector are connected to each other when the rotary disk storage device is pushed into the mounting structure. Accordingly, the clamper does not impede the connection of the interface connector that is to be made by inserting the rotary disk storage device into the mounting structure. A positive connection can therefore be made between the interface connector and the device connector.

The lever can position the clamper at the fixing position after the interface connector has been connected to the device connector. Consequently, the rotary disk storage device can be secured within a short period of time by operating the lever. The lever can position the clamper at the releasing position in a condition, in which the interface connector is connected to the device connector. Accordingly, it is possible to prevent the clamper from constituting an impediment to the removal of the rotary disk storage device from the mounting structure. The lever can be arranged to allow the rotary disk storage device to be slid out while keeping the clamper positioned at the releasing position. Disconnection of the interface connector and sliding out of the rotary disk storage device can therefore be done within a short period of time by simply operating the lever.

The clamper may be pressed by an elastic body in a direction perpendicular to the recording medium. The clamper may be moved between the fixing position and the releasing position by making use of a lever through opening formed in a body of the lever. The clamper may be moved between a position at which a bottom portion thereof comes into contact with the body of the lever and a position at which the bottom portion resides in the lever through opening. Further, the bottom portion of the clamper may be provided with an inclined surface and the clamper may be move between the releasing position and the fixing position when the inclined surface slides along an edge of the lever through opening.

The clamper includes a first clamper unit securing one end portion of the rotary disk storage device and a second clamper unit securing the other end portion of the rotary disk storage device. The first clamper unit comes into contact with the housing on an inclined surface thereof so as to apply forces to the housing in a vertical direction and a horizontal direction relative to the recording medium. The second clamper unit applies a force to the housing in a vertical direction relative to the recording medium. This arrangement allows the rotary disk storage device to be positively secured to the fixing structure in the vertical and horizontal directions. A lever position indicator may be formed on a lower surface of a gripper of the lever. This allows the positions of the lever associated with the fixing and releasing positions of the clamper to be easily visible. The lever position indicator may also be used as a lever supporting structure.

According to a second aspect of the present invention, there is provided an attachment and removal method for attaching a rotary disk storage device including a recording medium, an interface connector, and a housing to a mounting structure including a lever, a clamper, a device connector, and a guide, connecting the interface connector to the device connector, and removing the rotary disk storage device, the method comprising the steps of: positioning the clamper at a releasing position; connecting the interface connector to the device connector by pushing the rotary disk storage device in a direction running parallel with the recording medium along the guide while the clamper is positioned at the releasing position; pressing, following the step of connecting, the housing of the rotary disk storage device up against the guide by operating the lever to move the clamper to a fixing position; and stopping the pressure of the clamper on the housing by operating the lever while the interface connector and the device connector are connected to each other.

According to the present invention, a mounting structure is adapted to attach and remove the rotary disk storage device thereto and therefrom within a short period of time. According to the present invention, a mounting structure that allows the magnetic disk drive to be positively secured in position can be provided. Further, according to the present invention, a mounting structure that allows the interface connector to be connected positively can be provided. Further, according to the present invention, a test chamber and an attachment and removal method for a rotary disk storage device to which such a mounting structure is applied, can be provided.

DETAILED DESCRIPTION OF THE INVENTION

Figure 1:
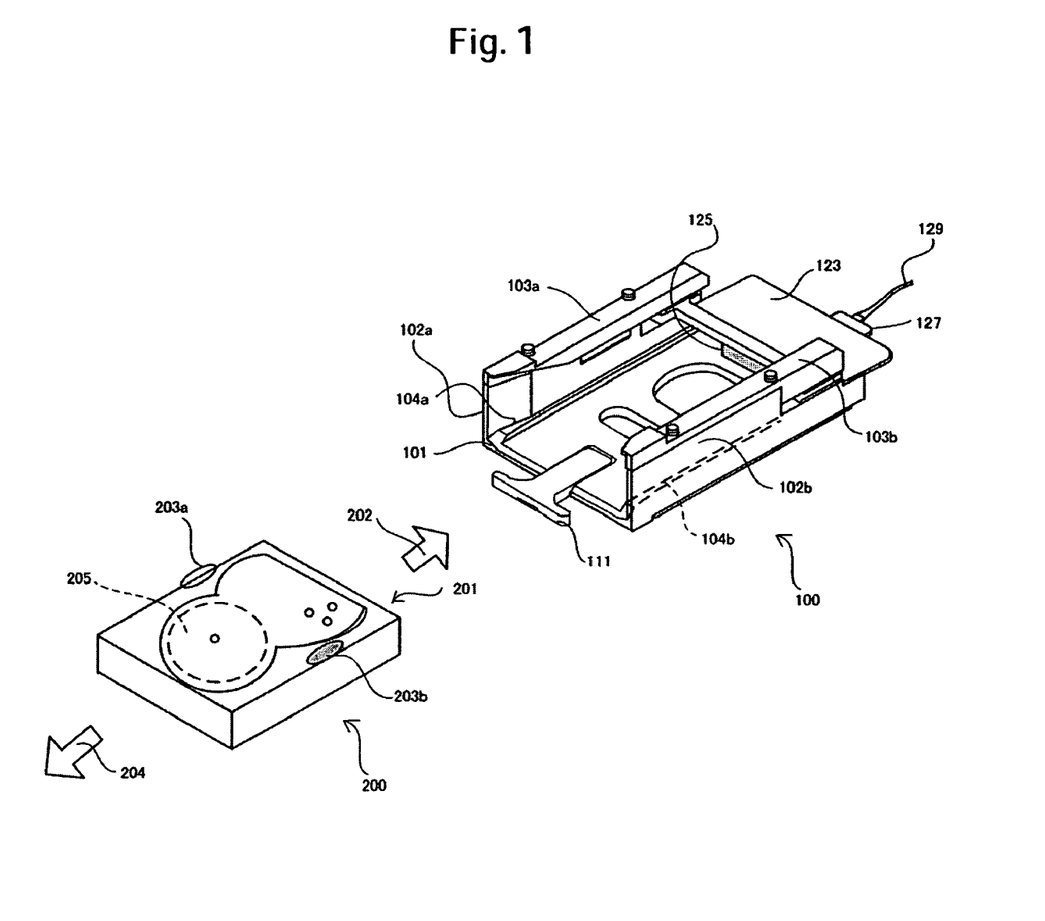
FIG. 1 is a perspective view showing a mounting structure and a magnetic disk drive according to an embodiment of the present invention.

FIG. 1 is a perspective view showing a mounting structure 100 and a magnetic disk drive 200 according to a specific embodiment of the present invention. A frame 101 includes a pair of sidewalls 102a, 102b, a pair of rails 104a, 104b, and a lever 111. A pair of upper frames 103a, 103b is attached to the upper portion of the frame 101. The frame 101 is further mounted with a circuit board 123. The circuit board 123 includes a device connector 125 and a plug 127 connected to the device connector 125. The plug 127 is connected to a test computer with a wire 129.

The magnetic disk drive 200 houses a magnetic disk 205 therein and is covered with a housing on an outside thereof. An interface connector (not shown) connectable to the device connector 125 is attached on the side of a surface of the housing represented by reference numeral 201. How to mount the magnetic disk drive 200 to the mounting structure 100 and connect the interface connector to the device connector 125 will be first outlined. The magnetic disk drive 200 is placed on the rails 104a, 104b of the mounting structure 100 and pushed in the direction of an arrow 202 so that the interface connector is connected to the device connector 125.

The lever 111 is then pushed in the direction of the arrow 202 so as to actuate a clamper (not shown) to press the fixing portions 203a, 203b of the housing from the above. Thus, the magnetic disk drive 200 is secured in position by being clamped by the frame 101 and the clamper. To remove the magnetic disk drive 200 from the mounting structure 100, the lever 111 is pulled in the direction of an arrow 204 to release the clamper clamping the magnetic disk drive 200. The lever 111 is further pulled to slide the magnetic disk drive 200 out of the mounting structure 100. The directions of the arrows 202, 204 run parallel with the magnetic disk 205 as a recording medium housed inside the housing of the magnetic disk drive 200.

Figure 2:
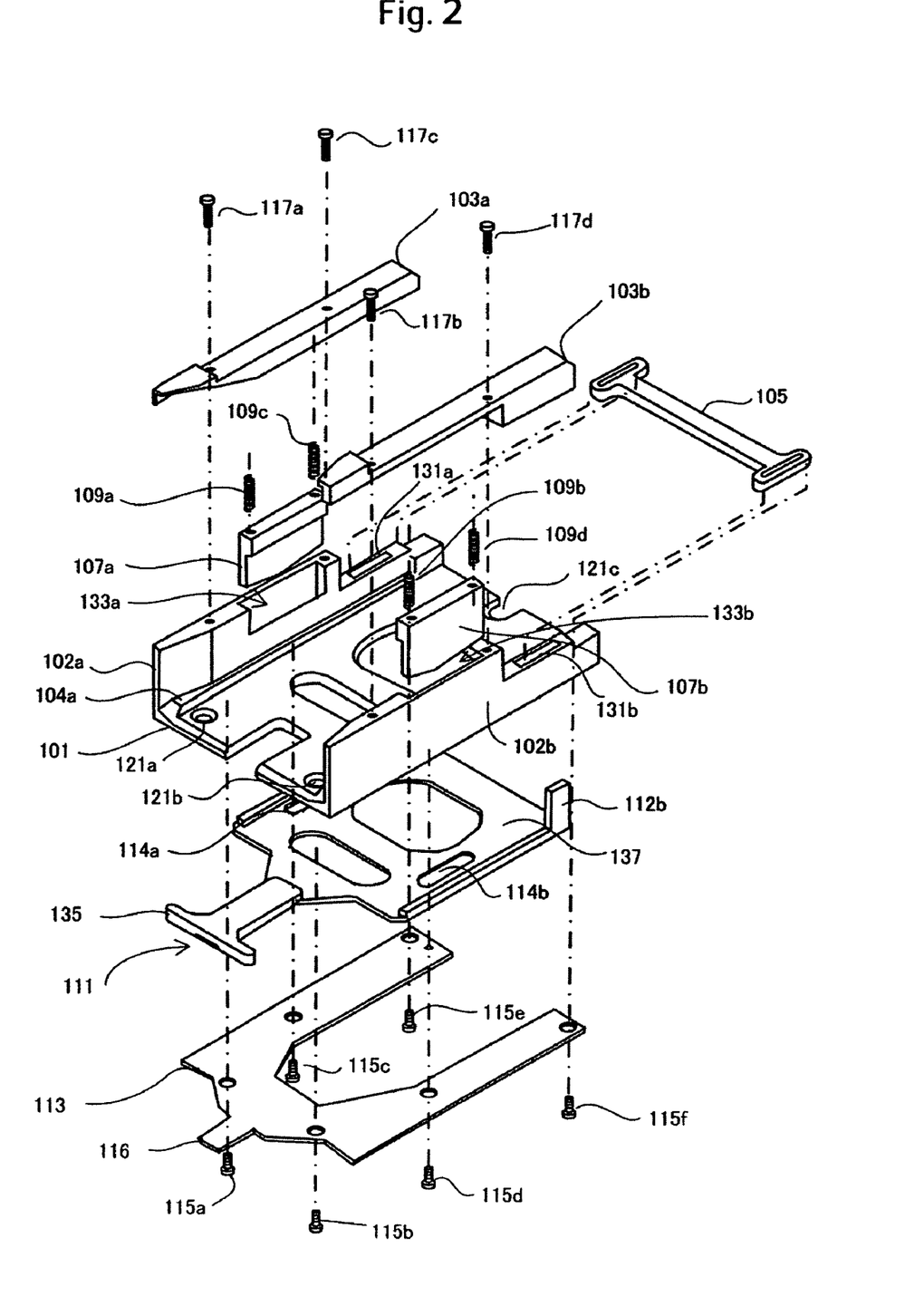
FIG. 2 is an exploded perspective view showing the mounting structure.
Figure 3:
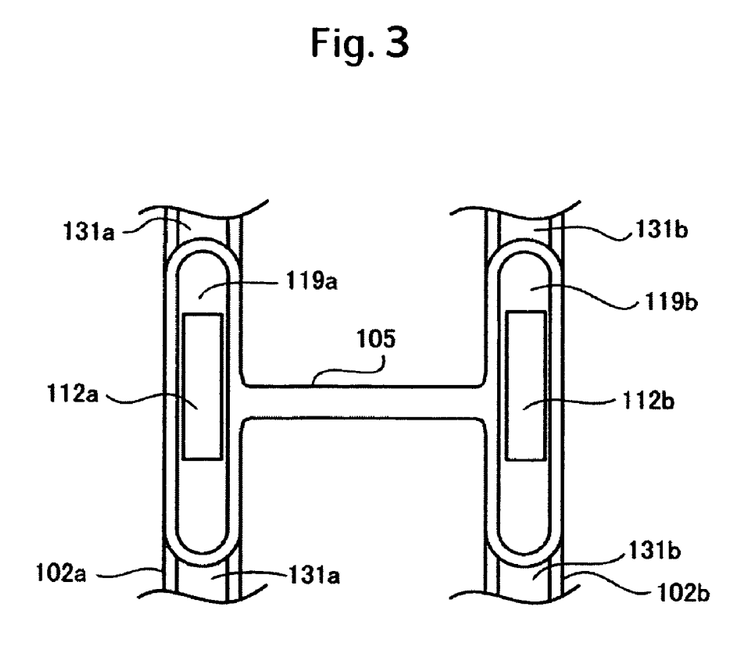
FIG. 3 is a plan view showing a pusher.
Figure 4:
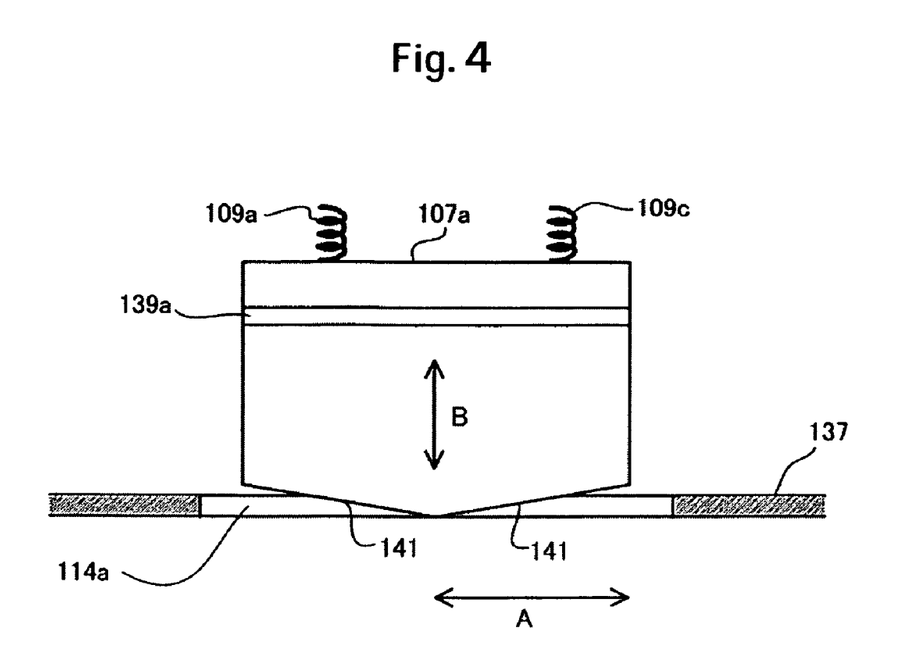
FIG. 4 is an explanatory view showing the operational relationship between a clamper and a lever.
Figure 5:
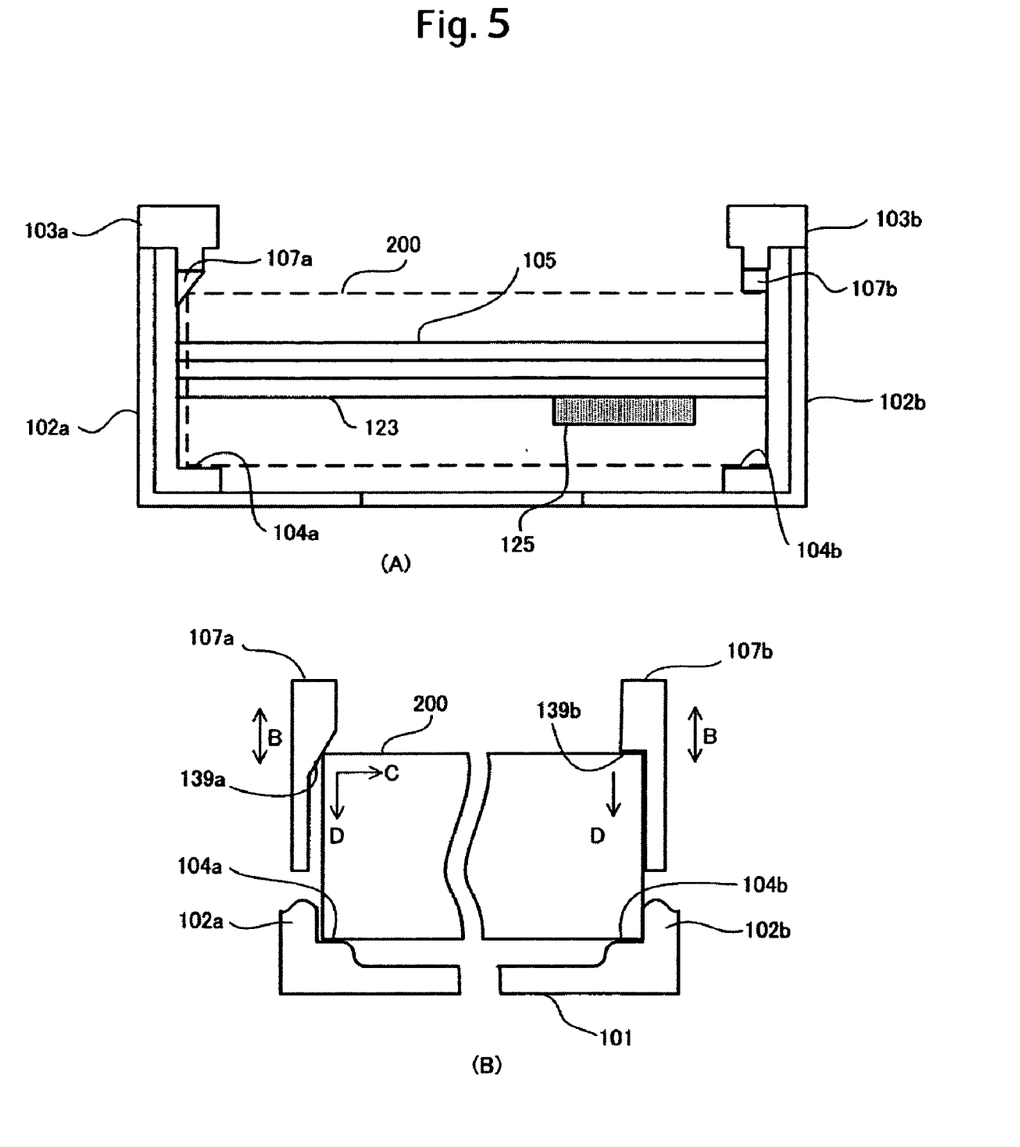
FIG. 5 illustrates a state in which the clamper secures the magnetic disk drive in position.
Figure 6:
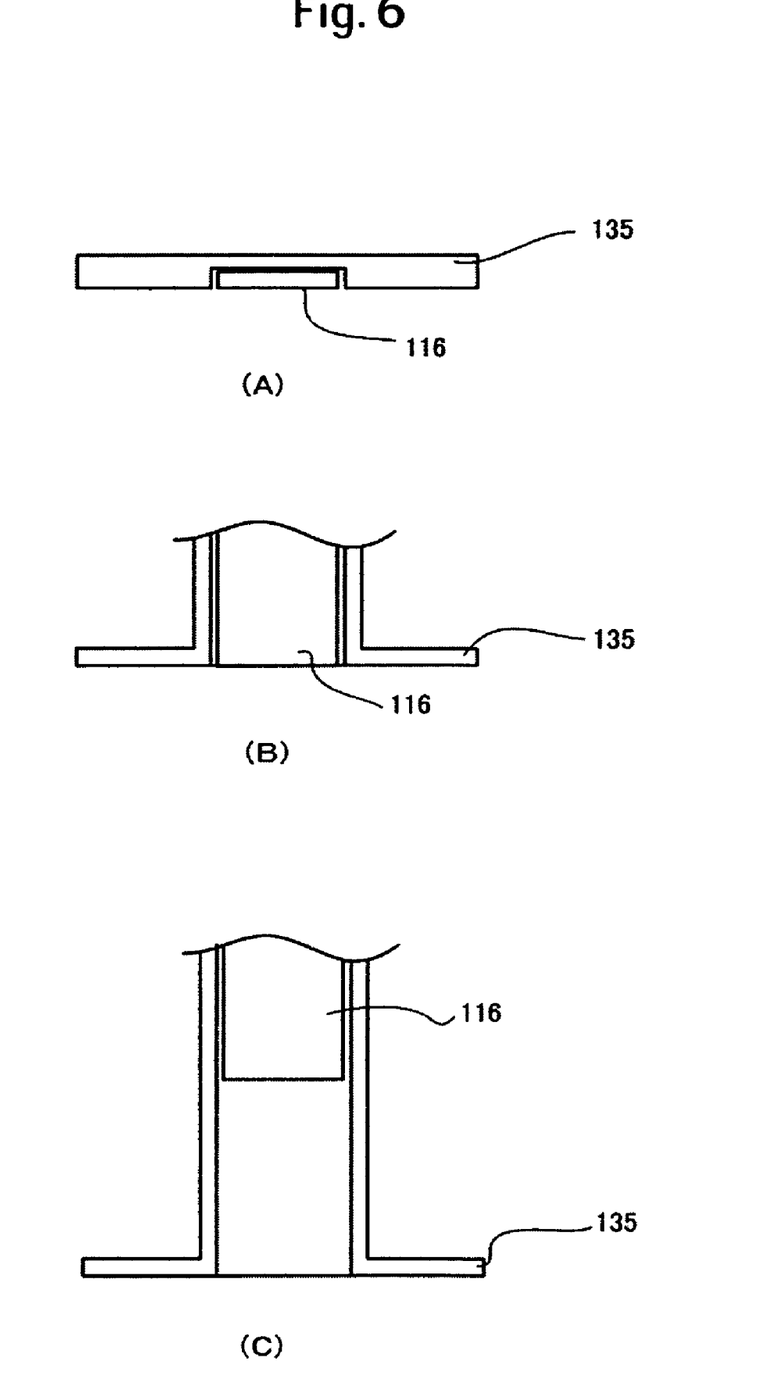
FIG. 6 illustrates an operation of a lever support.

The mounting structure 100 will be described in detail with reference to FIGS. 2 through 6. FIG. 2 is an exploded perspective view of the mounting structure 100. FIG. 3 is a plan view of a pusher 105. FIG. 4 is an explanatory view illustrating operations of the clamper and the lever. FIG. 5 includes explanatory views illustrating a state in which the clamper secures the magnetic disk drive in position. FIG. 6 includes explanatory views illustrating operation of a lever position indicator portion.

Referring to FIG. 2, the frame 101 occupies a basic structural portion of the mounting structure 100 housing the magnetic disk drive 200. The pair of rails 104a, 104b (see FIG. 1) is formed on the frame 101. The rails 104a, 104b allow the magnetic disk drive 200 to slide along a bottom portion of the housing as the magnetic disk drive 200 is pushed into the mounting structure 100. The rails 104a, 104b serve as guides for positioning the magnetic disk drive 200 inside the mounting structure 100 along a vertical direction or a direction perpendicular to the magnetic disk 205. The sidewalls 102a, 102b rise on both sides of the frame 101. The frame 101 is formed in its bottom portion with damper mounting holes 121a, 121b adapted to secure the mounting structure 100 to a test chamber. In addition, the frame 101 is formed in a periphery of the bottom portion with a semicircular damper mounting hole 121c.

Clamper guides 133a, 133b and sidewall through openings 131a, 131b are formed in the sidewalls 102a, 102b. Clampers 107a, 107b are inserted in the clamper guides 133a, 133b, respectively. Downward elastic forces are applied to the clampers 107a and 107b from above by springs 109a, 109b; 109c, 109d, respectively. The respective bottom portions of the clampers 107a, 107b penetrate through the sidewalls 102a, 102b and engage with lever 111 through openings 114a, 114b, respectively, formed in the body 137 of the lever 111. This structure will be described later in detail with reference to FIG. 4.

The respective inner surfaces of the sidewalls 102a, 102b serve as guides for positioning the magnetic disk drive 200 inside the mounting structure 100 along a right-to-left direction or a direction parallel with the magnetic disk 205. Each of the pair of upper frames 103a, 103b is attached to corresponding one of the respective upper portions of the sidewalls 102a, 102b. The upper frames 103a, 103b push the springs 109a, 109b; 109c, 109d from above to receive reactions from the clampers 107a, 107b, respectively.

The upper frames 103a, 103b are secured to the sidewalls 102a, 102b with screws 117a, 117b; 117c, 117d, respectively. Referring to FIG. 3, the pusher 105 is formed at its opposite ends with pusher through openings 119a, 119b. The pusher through openings 119a, 119b are aligned with the sidewall through openings 131a, 131b formed in the sidewalls 102a, 102b, respectively. FIG. 3 shows a state in which the pusher 105 is placed on top of the sidewall through openings 131a, 131b penetrating vertically through the sidewalls 102a, 102b, respectively.

The pusher through openings 119a, 119b are aligned with the sidewall through openings 131a, 131b, respectively. Each of engagement tabs 112a, 112b of the lever 111 penetrates through corresponding one of these openings from below. Accordingly, when the engagement tabs 112a, 112b of the lever 111 slide through the sidewall through openings 131a, 131b, respectively, the pusher 105 also slides along the same direction as the engagement tabs 112a, 112b do after the engagement tabs 112a, 112b have come into contact with the respective edges of the pusher through openings 119a, 119b, respectively.

Referring back to FIG. 2, the lever 111 is disposed between a cover 113 and a lower surface of the frame 101. The cover 113 is secured to the frame 101 with screws 115a, 115b, 115c, 115d, 115e, 115f. By operating a gripper 135 of the lever 111, the body 137 can be moved in the direction of the arrow 202 or the arrow 204 shown in FIG. 1 between the bottom surface of the frame 101 and the cover 113. The cover 113 is formed with a lever position indicator 116, which is located at a position corresponding to the lower surface of the gripper 135 of the lever 111. The body 137 of the lever 111 is formed with the lever through openings 114a, 114b. In addition, the body is formed with the engagement tabs 112a, 112b that protrude from the upper surface of the body 137 to penetrate through the sidewall through openings 131a, 131b, respectively (see FIG. 3 also).

Referring to FIG. 4, the operational relation between the clampers 107a, 107b and the lever 111 will be described by taking the clamper 107a as an example. The clamper 107a is formed with a pair of inclined portions 141 on its bottom portion. The pair of inclined portions 141 penetrate through the clamper guide 133a formed in the sidewall 102a and engage with the lever through opening 114a formed in the body 137 of the lever 111. Given a downward elastic force by the springs 109a, 109c, the clamper 107a descends if the body 137 is located such that the inclined portions 141 reside in the lever through opening 114a. When the body 137 moves and the inclined portion 141 contacts an edge of the lever through opening 114a, and if the body 137 further moves in the same direction, an edge of the body 137 gives the inclined portion 141 an upward force. This upward force overcomes the elastic force of the springs 109a, 109c so that the clamper 107a ascends. More specifically, in the structure shown in FIG. 4, when the body 137 moves in the direction of an arrow A, the clamper 107a moves in a vertical direction indicated by an arrow B.

FIG. 5 shows a state in which the magnetic disk drive 200 is housed and secured in position in the mounting structure 100. FIG. 5(A) shows the magnetic disk drive 200 as a dotted line. The housing of the magnetic disk drive 200 is placed on the rails 104a, 104b and end portions of the housing are clamped by the clampers 107a, 107b. As shown in FIG. 5B, the distance between inner surfaces of the sidewalls 102a, 102b is greater by about 1 mm than the width of the housing of the magnetic disk drive 200. This is to ensure that the magnetic disk drive 200 can be easily inserted into the mounting structure 100.

The clampers 107a, 107b are moved vertically (in the direction of the arrow B) through an operation of the lever 111. The clampers 107a, 107b are formed with jaws 139a, 139b, respectively, which press the associated end portions of the housing. The jaw 139a is formed into an inclined surface, while the jaw 139b is formed into a surface that runs parallel with the magnetic disk 205 (see FIG. 1). Each of the jaws 139a, 139b gives a force to the magnetic disk drive 200 inserted in the mounting structure 100 when the clampers 107a, 107b are lowered. Specifically, the jaw 139a applies a force in the direction of an arrow C and an arrow D to the corner 203a (see FIG. 1) of the housing. The jaw 139b applies a force in the direction of the arrow D to the upper surface 203b (see FIG. 1) of the housing.

The magnetic disk drive 200 is secured in the mounting structure 100 in the following manner. Specifically, the magnetic disk drive 200 is secured in the right-to-left direction between the jaw 139a and an inner surface of the sidewall 102b. The disk drive 200 is secured in the vertical direction by the jaws 139a, 139b and the rails 104a, 104b. By adopting this structure, the magnetic disk drive 200 can be inserted into the mounting structure 100 within a short period of time and positively secured to the frame 101.

The operation of the lever position indicator 116 formed on the cover 113 will be described with reference to FIG. 6. FIG. 6(A) is a front view of the gripper 135. FIG. 6(B) is a view showing the gripper 135 when the clampers 107a, 107b are moved to a fixing position as viewed from the side of the lever position indicator 116. FIG. 6(C) is a view showing the gripper 135 when the clampers 107a, 107b are moved to a releasing position as viewed from the side of the lever position indicator 116. Whether the lever 111 is located at the fixing position or the releasing position relative to the clampers can be easily recognized by identifying the positional relation between the lever position indicator 116 and the gripper 135 when the lever 111 slides relative to the lever position indicator 116. In addition, the lever position indicator 116 is formed so as to support a lower portion of the gripper 135 that protrudes into a space, thus functioning to support the gripper 135.

Figure 7:
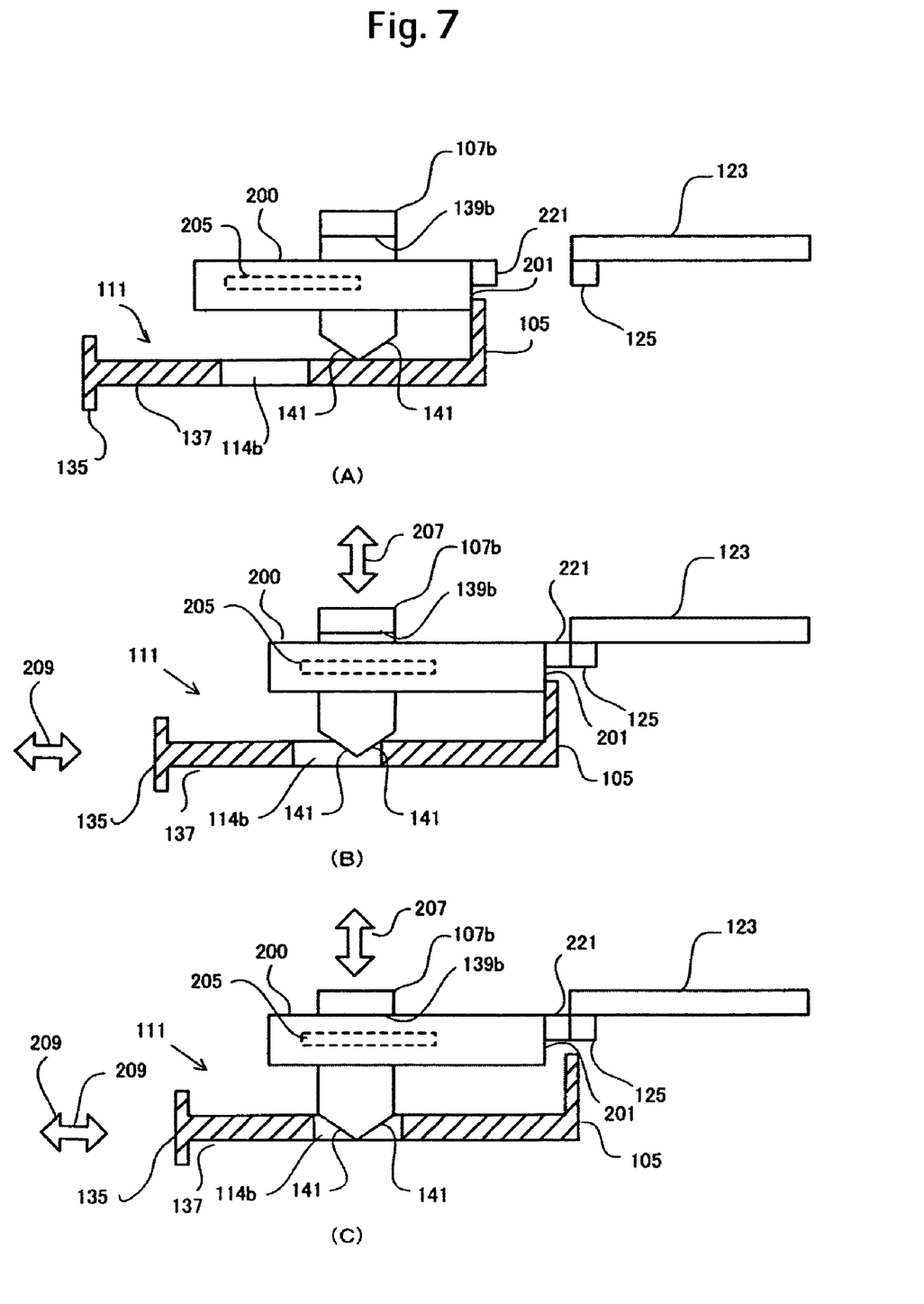
FIG. 7 schematically illustrates the operation of the mounting structure.

The operation of the mounting structure 100 when the magnetic disk drive 200 is mounted to and removed from the mounting structure 100 will be described with reference to FIG. 7. FIG. 7 includes simplified views for describing the operation. The figures show as the mounting structure 100 only the lever 111, the pusher 105 drawn to operate integrally with the clamper, and the clamper 107b. An interface connector 221 of the magnetic disk drive 200 is mounted on a surface of the housing, the surface being perpendicular to the front surface of the magnetic disk 205.

The device connector 125 attached to the circuit board 123 includes a positioning guide relative to the interface connector 221. Accordingly, pushing the magnetic disk drive 200 in the direction of the interface connector 221 will align the interface connector 221 finely with the device connector 125 to establish connection between the two. When the magnetic disk drive 200 is to be mounted on the mounting structure 100, the gripper 135 of the lever 111 is first slid out so that the inclined portions 141 ride over the body 137, thereby placing the clampers 107*a*, 107*b* in the releasing position (see FIG. 7(A)).

The bottom portion of the housing of the magnetic disk drive 200 is placed on the rails 104*a*, 104*b* and the magnetic disk drive 200 is pushed in with force applied thereto with the interface connector at the front. The magnetic disk drive 200 is then guided by the rails 104*a*, 104*b* and the sidewalls 102*a*, 102*b*. It can then eventually be confirmed that the interface connector 221 is connected to the device connector 125 (FIG. 7(B)). The magnetic disk drive 200 can be tested properly only if there is a good connection of the connectors. The step of making the connection between the connectors is performed, not by using a member of some sort, but by an operator him/herself who directly holds the magnetic disk drive 200 to make the connection. This ensures positive connection of the connectors.

Herein, part of the inclined portions 141 of the clampers 107*a*, 107*b* resides inside the lever through openings 114*a*, 114*b*, thus causing the clampers 107*a*, 107*b* to descend slightly. The jaws 139*a*, 139*b*, however, contact the housing and the clampers 107*a*, 107*b* do not yet descend to secure the housing in the fixing position. The magnetic disk drive 200 is not therefore prevented from being inserted. The gripper 135 is then pressed to push the body 137 so that the inclined portions 141 of the clampers 107*a*, 107*b* are placed all the way in the lever through openings 114*a*, 114*b*, respectively (see FIG. 7(C)). In this condition, the clampers 107*a*, 107*b* descend to their lowest positions, thus causing the jaws 139*a*, 139*b* to secure the end portions of the housing. Pressing hard the end portions of the housing does not result in internal parts of the magnetic disk drive being damaged. The end portions of the housing are therefore effective as fixing locations.

To remove the magnetic disk drive 200 from the mounting structure 100, the gripper 135 is pulled to move the body 137 up to a position, at which the clampers 107*a*, 107*b* release the magnetic disk drive 200, as shown in FIG. 7(B). When the gripper 135 is further pulled out, the pusher 105 pushes an end portion 201 of the magnetic disk drive, causing the magnetic disk drive 200 to be slid out onto the side of the gripper 135. At this time, the inclined portions 141 of the clampers 107*a*, 107*b* come into contact with the end portions of the lever through openings 114*a*, 114*b*, respectively, causing the clampers 107*a*, 107*b* to ascend slightly. When the gripper 135 is pulled, however, the jaws 139*a*, 139*b* go up further, not impeding removal of the magnetic disk drive 200.

Figure 8:
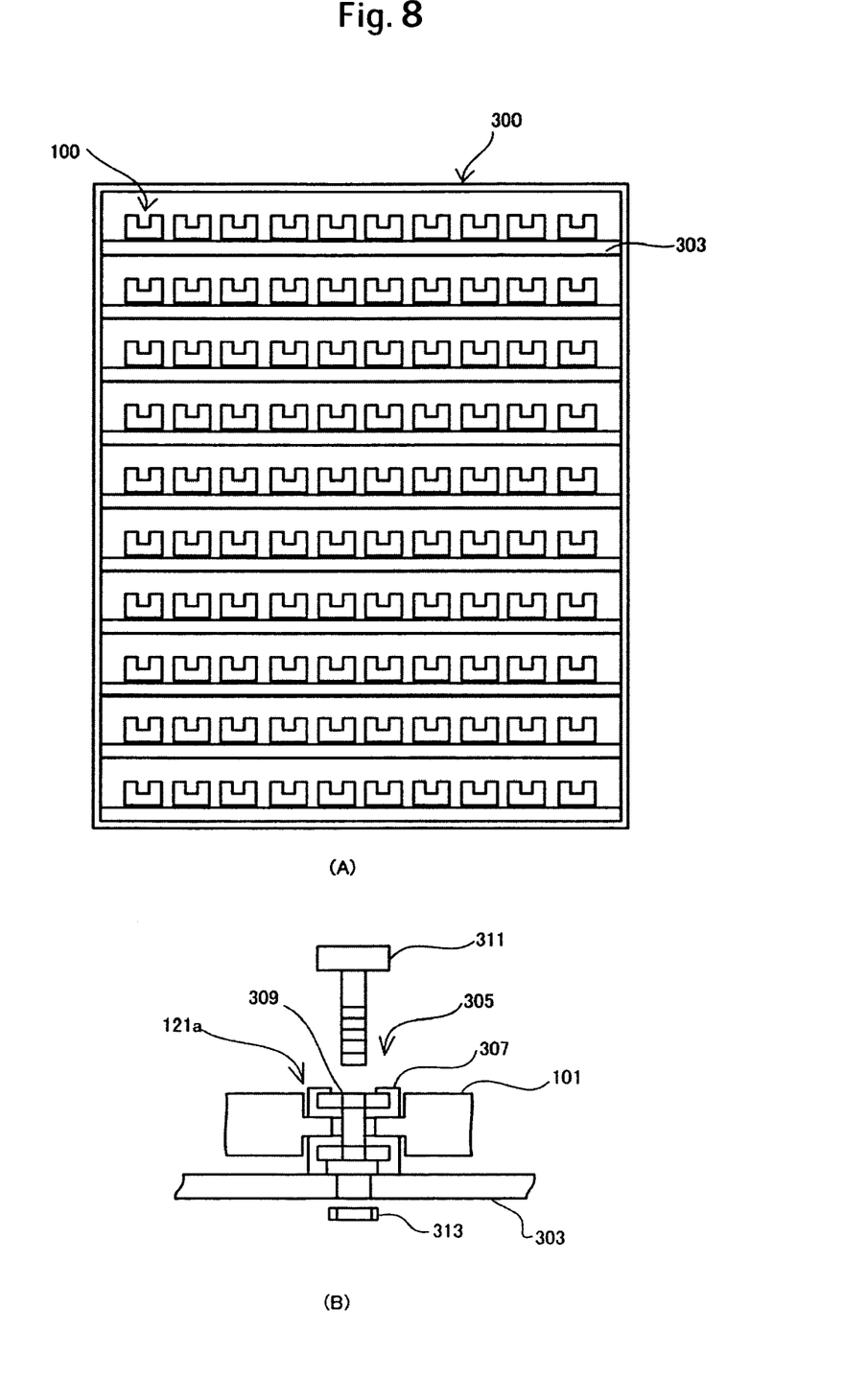
FIG. 8 shows a test chamber.

FIG. 8 is an outline view showing a test chamber 300 having a cell-like array of a number of mounting structures 100. The test chamber includes a large number of mounting structures 100 secured to a fixing frame 303 as shown in FIG. 8(A). FIG. 8(B) is an enlarged cross sectional view showing a portion of the fixing frame 303, to which the frame of the mounting structure 100 is secured. A damper 305 is accommodated in a damper mounting hole 121*a* formed in the frame 101. The damper 305 is an elastic body such as rubber that surrounds a sleeve 309. The frame 101 of the fixing structure 100 is secured to the fixing frame 303 of the test chamber 300 using a bolt 311 and a nut 313. This dampens vibration transmitted between the fixing frame 303 and the frame 101.

Consequently, when the magnetic disk drives 200 are tested by installing a large number of mounting structures 100 in the test chamber 300, it becomes less likely that vibration is transmitted from the fixing frame 303 to each of the magnetic disk drives 200, or vice versa. A test computer for testing the magnetic disk drives is connected to the test chamber 300.

The mounting structure 100 according to the embodiment of the present invention is suitable for use in securing the rotary disk storage device, such as the magnetic disk drive, so as to be easily removable and remountable.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A mounting structure adaptable to attach and remove a rotary disk storage device having a recording medium, an interface connector, and a housing, and to plug and unplug the interface connector, the mounting structure comprising:
    a device connector connectable to the interface connector;
    a guide which positions the rotary disk storage device within the mounting structure;
    a clamper movable in a vertical direction of the recording medium between a fixing position and a releasing position to fix or release an end portion of the housing, wherein the clamper is pressed by an elastic body in a direction perpendicular to the recording medium; and
    a lever capable of positioning the clamper at the releasing position until the interface connector is connected to the device connector as the rotary disk storage device is pushed into the mounting structure, and positioning the clamper at the fixing position after the interface connector has been connected to the device connector, wherein the lever is provided with a lever through opening and the clamper moves between a position at which a bottom portion of the clamper comes into contact with a body of the lever and a position at which the bottom portion of the clamper resides in the lever through opening so as to provide the releasing position and the fixing position, respectively.

2. The mounting structure according to claim 1, wherein the lever is configured to position the clamper at the releasing position with the interface connector connected to the device connector.

3. The mounting structure according to claim 1, wherein the lever allows the rotary disk storage device to be pulled out, while positioning the clamper at the releasing position.

4. The mounting structure according to claim 3, further comprising:
    a pusher transmitting a force applied to the lever to the housing when the lever is operated in a direction of pulling the rotary disk storage device out of the mounting structure.

5. The mounting structure according to claim 1, wherein the clamper is provided with an inclined surface on the bottom portion thereof and the inclined surface slides along an edge of the lever through opening such that the clamper moves between the releasing position and the fixing position.

6. The mounting structure according to claim 1, wherein the clamper includes a first clamper unit securing one end portion of the rotary disk storage device and a second clamper unit securing the other end portion of the rotary disk storage device, the first clamper unit coming into contact with the housing on an inclined surface thereof so as to apply forces to the housing in a vertical direction and a horizontal direction relative to the recording medium and the second clamper unit applying a force to the housing in a vertical direction relative to the recording medium.

7. The mounting structure according to claim 1, further including a lever position indicator formed on a lower surface of a gripper of the lever.

8. The mounting structure according to claim 1, wherein the interface connector is formed on a surface of the housing, the surface being perpendicular to the recording medium.

9. The mounting structure according to claim 1, wherein the device connector is configured to be connected to a test computer used for testing the rotary disk storage device.

10. The mounting structure according to claim 1, wherein the rotary disk storage device is a magnetic disk drive.

11. A mounting structure adaptable to attach and remove a rotary disk storage device having a recording medium, an interface connector, and a housing, and to plug and unplug the interface connector, the mounting structure comprising:
a device connector connectable to the interface connector;
guide means for positioning the interface connector with the device connector when the rotary disk storage device is pushed into the mounting structure;
fixing means for fixing the housing, the fixing means being movable by an elastic force applied thereto in a vertical direction relative to the recording medium, between a fixing position and a releasing position to fix or release the housing; and
operating means for positioning the fixing means at the releasing position until the interface connector is connected to the device connector when the rotary disk storage device is pushed into the mounting structure, and positioning the fixing means at the fixing position after the interface connector has been connected to the device connector, wherein the operating means is provided with a through opening and the fixing means moves between a position at which a bottom portion of the fixing means comes into contact with a bottom portion of the operating means and a position at which the bottom portion of the fixing means resides in the through opening so as to provide the releasing position and the fixing position, respectively.

12. The mounting structure according to claim 11, wherein the fixing means moves to the releasing position when the operating means is operated in a condition where the interface connector and the device connector are connected to each other.

13. The mounting structure according to claim 11, wherein the operating means allows the rotary disk storage device to be pulled out, while positioning the fixing means of the releasing position.

14. The mounting structure according to claim 13, further comprising means for transmitting a force applied to the operating means to the housing when the operating means is operated in a direction of pulling the rotary disk storage device out of the mounting structure.

15. A test chamber for a rotary disk storage device including an interface connector, comprising:
a plurality of mounting structures adaptable to attach and remove the rotary disk storage device thereto and therefrom and to plug and unplug the interface connector therein and therefrom;
a frame which supports the plurality of mounting structures; and
a damper which secures each of the plurality of mounting structures to the frame;
each of the plurality of mounting structures comprising:
a device connector connectable to the interface connector;
a guide which positions the rotary disk storage device within the mounting structure;
a clamper movable in a vertical direction of the recording medium between a fixing position and a releasing position to fix or release an end portion of the housing, wherein the clamper is pressed by an elastic body in a direction perpendicular to the recording medium; and
a lever capable of positioning the clamper at the releasing position until the interface connector is connected to the device connector as the rotary disk storage device is pushed into the mounting structure, and positioning the clamper at the fixing position after the interface connector has been connected to the device connector, wherein the lever is provided with a lever through opening and the clamper moves between a position at which a bottom portion of the clamper comes into contact with a body of the lever and a position at which the bottom portion of the clamper resides in the lever through opening so as to provide the releasing position and the fixing position, respectively.

16. An attachment and removal method for attaching a rotary disk storage device including a recording medium, an interface connector, and a housing to a mounting structure including a lever, a clamper, a device connector, and a guide, connecting the interface connector to the device connector, and removing the rotary disk storage device, the method comprising:
positioning the clamper at a releasing position at which a bottom portion of the clamper comes into contact with a bottom portion of the lever;
connecting the interface connector to the device connector by pushing the rotary disk storage device in a direction running parallel with the recording medium along the guide while the clamper is positioned at the releasing position;
pressing, following the step of connecting, the housing of the rotary disk storage device up against the guide by operating the lever to move the clamper to a fixing position wherein the lever is provided with a lever through opening and the clamper moves between the releasing position at which a bottom portion of the clamper comes into contact with a body of the lever and the fixing position at which the bottom portion of the clamper resides in the lever through opening; and
stopping the pressure of the clamper on the housing by operating the lever while the interface connector and the device connector are connected to each other.

17. The attachment and removal method according to claim 16, further comprising:
disconnecting, following the step of stopping, the interface connector from the device connector by operating the lever and sliding the rotary disk storage device out of the mounting structure.

18. The attachment and removal method according to claim 16, wherein pressing includes allowing the clamper to elastically pressing up against an end portion of the housing.

* * * * *